(12) United States Patent
Sarma

(10) Patent No.: US 7,301,352 B1
(45) Date of Patent: Nov. 27, 2007

(54) HIGH SENSITIVITY SINGLE OR MULTI SENSOR INTERFACE CIRCUIT WITH CONSTANT VOLTAGE OPERATION

(76) Inventor: Garimella R. Sarma, 905 Edgewater Dr., Newport News, VA (US) 23602

( * ) Notice: Subject to any disclaimer, the term of this patent is extended or adjusted under 35 U.S.C. 154(b) by 0 days.

(21) Appl. No.: 11/475,303

(22) Filed: Jun. 27, 2006

Related U.S. Application Data

(60) Provisional application No. 60/773,872, filed on Nov. 7, 2005.

(51) Int. Cl.
*G01R 27/08* (2006.01)

(52) U.S. Cl. ........................ 324/691; 324/713

(58) Field of Classification Search .............. 324/691
See application file for complete search history.

(56) References Cited

U.S. PATENT DOCUMENTS

| | | | |
|---|---|---|---|
| 3,754,442 A * | 8/1973 | Arnett ........................ 324/720 |
| 5,074,147 A | 12/1991 | Sarma | |
| 5,191,269 A * | 3/1993 | Carbolante .................. 318/254 |
| 5,272,915 A | 12/1993 | Gelbach et al. | |
| 6,078,480 A * | 6/2000 | Schandl et al. ............. 360/132 |
| 6,335,642 B1 * | 1/2002 | Hiroshima et al. ......... 324/691 |
| 6,720,734 B2 * | 4/2004 | Norris ........................ 315/149 |
| 2004/0201393 A1 * | 10/2004 | Nitadori ..................... 324/763 |
| 2006/0087326 A1 * | 4/2006 | Stevens ....................... 324/680 |

OTHER PUBLICATIONS

U.S. Appl. No. 11/054,642, filed Feb. 9, 2005, Sarma and Mangalam.

* cited by examiner

*Primary Examiner*—Anjan Deb
*Assistant Examiner*—Timothy J Dole
(74) *Attorney, Agent, or Firm*—Peter J. Van Bergen

(57) ABSTRACT

A sensor interface circuit is provided to interface many sensors simultaneously in a simple circuit arrangement consisting of two parts. Sensors in both parts operate under identical constant voltage. The circuit provides higher front end sensitivity than the Wheatstone bridge, with temperature compensation from all sensors. The circuit also can provide output zeroing to obtain high resolution measurements. The invention can be used as a unique constant voltage anemometer with auto zeroing, and with much higher sensitivity than related devices. Further, in the constant voltage anemometer embodiment, the time constant and the overheat of the hot-wire/hot-film can be measured in true in situ mode under actual test conditions. In another embodiment, the circuit can be used to measure dynamic capacitance from capacitance sensors, without any effect of associated cable capacitance.

7 Claims, 4 Drawing Sheets

HIGH SENSITIVITY SINGLE OR MULTI SENSOR INTERFACE CIRCUIT WITH CONSTANT VOLTAGE OPERATION

This application claims the benefit of U.S. Provisional Application No. 60/773,872 filed Nov. 7, 2005 and entitled "High sensitivity single or multi sensor measurement circuit for single ended or differential measurements".

BACKGROUND OF THE INVENTION

1. Field of the Invention

The field of invention relates to circuitry for measurement applications with sensors. The invention relates more particularly to sensor interface circuitry for applications using multiple resistance sensors and capacitance sensors.

2. Description of the Related Art

In related art for similar applications are the potentiometer and the Wheatstone bridge. The Wheatstone bridge is by far much more popular than the potentiometer. The Wheatstone bridge has very unique temperature compensation capability with resistance strain gages but has very limited sensitivity. It invariably requires large post-amplification to obtain reasonable measurement sensitivity. Further, a Wheatstone bridge can accommodate measurements from a maximum of only two pairs of sensors. Usually, one of the pairs will have positive changing resistances (like those obtained with tensile strain in resistance strain gages), and the other pair simultaneously uses negative changing resistances (like those obtained with compressive strain). Because of the particular disposition of the positive and negative changing pairs in the Wheatstone bridge, the Wheatstone bridge uniquely provides compensation for sensor resistance changes with ambient temperature. Resistances used for the sensors invariably have tolerances; therefore the Wheatstone bridge always needs initial balancing of the bridge for higher resolution measurements. This balancing is usually accomplished by changing the ratio of the bridge arms.

SUMMARY OF THE INVENTION

Accordingly, it is an objective of the present sensor interface circuit invention to provide a means of performing measurements using resistance sensors like strain gages and temperature sensors from at least one to many sensor pairs by connecting them to the invented sensor interface circuit. Circuit capability to measure from many sensors simultaneously enhances the measurements with several times the sensitivity of the Wheatstone bridge. The strain gage sensors are generally located on a structure or an object. This structure or object is then subjected to a test input like an external force causing changes, in the resistances of the strain gages, in response to the strains from the test input. This invention enables covering a larger area on the test object with a single circuit or maximizing the sensitivity over a given area on the test object with many strain gages.

Yet another objective of my invention is to provide a sensitivity coefficient, several times larger than the sensitivity coefficient of a Wheatstone bridge under identical sensor operating conditions. The new sensitivity coefficient is over and above the higher sensitivity already provided by many sensor pairs.

A further objective of the invention is to provide the capability of measurements from two sets of sensors with their difference output available. Such a capability offers several advantages in engineering measurements like temperature compensation, non-linearity corrections, drift corrections in the sets and comparisons of the two sets.

Another objective of the invention is to provide benefits, like insignificant electromagnetic noise and operation independent of cable capacitance, by operating all the sensors with a constant voltage.

In at least one embodiment, the new sensor interface circuit can be used as a Constant Voltage Anemometer for hot-wire or hot-film measurements.

In this constant voltage anemometer embodiment, the circuit can provide true in situ measurement of the hot-wire/hot-film time constant as well as its overheat.

In at least one other embodiment, the new sensor interface circuit can be used to measure real time capacitance changes with capacitance sensors without any effect of its cable capacitance on the measurement.

To meet the above objectives, a circuit is invented to interface many sensors simultaneously in a simple circuit arrangement consisting of two parts. Sensors in both parts operate under identical constant voltage. The circuit provides higher front end sensitivity than the Wheatstone bridge, with temperature compensation from all sensors. The circuit can also provide output zeroing to obtain high resolution measurements. The invention can be used as a unique constant voltage anemometer with auto output zeroing, and with much higher sensitivity than related devices. Further, in the constant voltage anemometer embodiment, the time constant and the overheat of the hot-wire/hot-film can be measured in true in situ mode under actual test conditions. In another embodiment, the circuit can be used to measure dynamic capacitance from capacitance sensors, without any effect from associated cable capacitance.

DETAILED DESCRIPTION OF THE INVENTION

Detailed description of the invention is presented below to supplement the figures.

Figure 1:
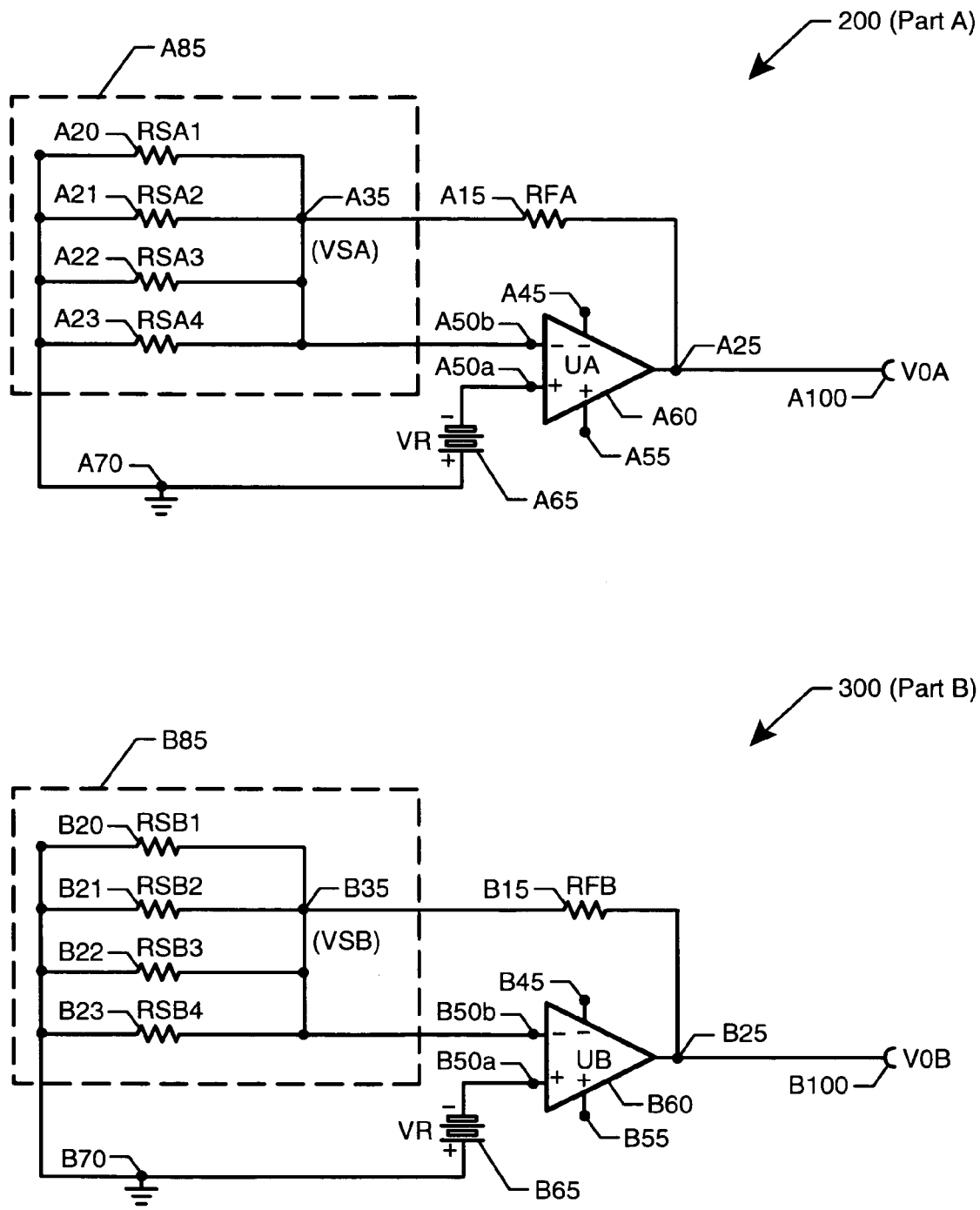
FIG. 1 is a circuit schematic drawing of one embodiment of the present sensor interface circuit invention containing two parts, Part A and Part B, with their respective outputs ready for difference measurements and each part with four pairs of sensors.

One embodiment of the sensor interface circuit configuration is shown in FIG. 1. The illustrated embodiment contains two identical parts, circuit 200 containing Part A and circuit 300 containing Part B. Four sensors are shown in each part for illustration purposes only. It will be shown in the following description that each part of the circuit produces at its output a voltage change proportional to sum of fractional changes in each sensor resistance in that part of the circuit. The difference of the outputs of the two parts will then be similar to that of Wheatstone bridge output except now there are more sensor pairs and the circuit will have larger sensitivity. The illustrated circuit is for measurements using resistance sensors. Detailed description of Part A is given below, but the same description applies to Part B also.

Resistance sensor elements A20 (with corresponding resistance RSA1), A21 (with corresponding resistance RSA2), A22 (with corresponding resistance RSA3), and A23 (with corresponding resistance RSA4) are shown in Box A85. The resistance sensors are connected in parallel with leads connected at the inverting input point A50$b$ of operational amplifier A60. In FIG. 1, the inverting input point A50$b$ is electrically connected to junction A35 (the junction formed by the resistance sensor leads and the inverting input of the operational amplifier). One of ordinary skill in the art of electronics and electrical circuitry will recognize that the operational amplifier A60, in addition to an inverting input, will have a non-inverting input and at least one power terminal. An operational amplifier circuit used in linear applications such as this invention, further will always have a negative feedback usually through a resistor called a feedback resistor (A15 in FIG. 1). In the illustrated embodiment of FIG. 1, the other end (or leads) of the parallel sensors A20 through A23 are connected to circuit ground at A70. An identical arrangement applies to corresponding sensor elements B20, B21, B22 and B23 with corresponding resistances RSB1, RSB2, RSB3 and RSB4 in Part B.

The first end of a constant reference voltage source A65 (with Voltage VR) is connected to the non-inverting input A50$a$ of operational amplifier A60. The second end of the voltage source A65 is connected to the ground at A70.

The non-inverting input terminal B50$a$ of the operational amplifier B60 in Part B is also connected to a constant voltage B65 in a similar way.

It should be noted that instead of two separate constant voltage references for each part, one constant voltage VR could be connected to both the parts of the circuit at the non-inverting inputs.

The operational amplifiers are connected to the standard power supplies (not shown) at the terminals A45 and B45 to a negative supply and at A55 and B55 to positive supply.

Feedback resistor A15 (with resistance RFA) for the operational amplifiers A60 is disposed between terminals A25 (output of the operational amplifier A60) and A35 (the inverting input junction of operational amplifier A60). Similarly feedback resistor B15 (with resistance RFB) for the operational amplifier B60 is disposed between terminals B25 (output of operational amplifier B60) and B35 (inverting input point of operational amplifier B60).

Output voltage leads A100 and B100 from both parts are distinctly brought out for output measurements.

Detailed functional operation of the new sensor interface circuit is presented below mainly in terms of Part A. The description is also applicable to Part B.

A constant voltage source VR is incorporated in the circuit as a means of applying constant voltage across the sensors. The principle of constant voltage operation of the present invention is based on the fact that voltages VR (a constant) at the non-inverting terminal A50$a$ and the voltage at the inverting terminal A50B of the operational amplifier A60 will be practically identical in the linear operational range of a high gain operational amplifier. The voltage at inverting terminal A50$b$ of the operational amplifier is designated as VSA (which is also equal to constant reference voltage VR) to indicate that it is the voltage across the sensors in Part A.

With the voltage across the sensors remaining constant at VSA due to constant voltage VR, a change in sensor resistances ($\Delta RSA1$, $\Delta RSA2$, $\Delta RSA3$ and $\Delta RSA4$), in response to any applied test input on the test object where the sensors are located, will produce a change in sensor currents ($\Delta ISA1$, $\Delta ISA2$, $\Delta ISA3$, $\Delta ISA4$ respectively). The path of the sensor currents is only through the feedback resistor A15. Thus, the change in the currents through the sensors due to the test input produce a change in voltage drop across the feedback resistor proportional to the test input.

With all the sensors in parallel and VSA remaining constant:

$$VSA = (RSA1*ISA1) = (RSA2*ISA2) = (RSA3*ISA3) = (RSA4*ISA4) = \text{a constant} \quad \text{(Eq. 1)}$$

It may be noted that although only four sensors are shown in Part A and Part B, the new sensor interface circuit is not limited to handling only four sensors. It can easily handle more sensors with proper design.

The governing equation for Part A for the four sensors in FIG. 1 can be written as:

$$V0A = VSA\left[1 + RFA\left[\left(\frac{1}{RSA1}\right) + \left(\frac{1}{RSA2}\right) + \left(\frac{1}{RSA3}\right) + \left(\frac{1}{RSA4}\right)\right]\right] \quad \text{(Eq. 2)}$$

Those of ordinary skill in the art of circuit analysis can follow that the change in operational amplifier output voltage $\Delta V0A$ in response to sensor resistance changes ($\Delta RSA1$, $\Delta RSA2$, $\Delta RSA3$ and $\Delta RSA4$) from Eq. 2 can be obtained as:

$$\left(-\frac{\Delta V0A}{VSA}\right) = RFA\left[\frac{1}{RSA1}\left(\frac{\Delta RSA1}{RSA1}\right) + \frac{1}{RSA2}\left(\frac{\Delta RSA2}{RSA2}\right) + \frac{1}{RSA3}\left(\frac{\Delta RSA3}{RSA3}\right) + \frac{1}{RSA4}\left(\frac{\Delta RSA4}{RSA4}\right)\right] \quad \text{(Eq. 3)}$$

The above derivation teachings are for Part A of the new sensor interface circuit. For Part B, a similar equation will emerge, repeating Eq. 3 for Part B:

$$\left(-\frac{\Delta V0B}{VSB}\right) = RFB\left[\frac{1}{RSB1}\left(\frac{\Delta RSB1}{RSB1}\right) + \frac{1}{RSB2}\left(\frac{\Delta RSB2}{RSB2}\right) + \frac{1}{RSB3}\left(\frac{\Delta RSB3}{RSB3}\right) + \frac{1}{RSB4}\left(\frac{\Delta RSB4}{RSB4}\right)\right] \quad \text{(Eq. 4)}$$

Sensitivity Coefficients

In this section, using established analysis procedures a sensitivity coefficient of each part of the circuit is obtained.

It is known that the resistance sensors change their value in response to some physical input acting on the sensors. There are only two possibilities for this resistance change, either positive change (that is, the sensor resistance increases in response to the input) or negative change (that is, the sensor resistance decreases in response the input). Changes in all sensors (positive and negative) manifest simultaneously to a given input, with their signs determined by their location on the test object. With this invention, several sensors are arranged into two sets. One such arrangement is with the first set having all the sensors with increasing resistances changes (positive resistance changes) and the second set with all sensors having decreasing resistances changes (negative resistance changes) in response to test inputs. Each set of the sensors are then connected to one part of the new sensor interface circuit to obtain measurements from all of them simultaneously as an algebraic sum of all the fractional changes. A typical practical situation is in resistance strain gage applications where strain gages are subjected simultaneously to tensile forces (positive change) and compressive forces (negative changes) for the same load input.

In another situation, there could be a need to obtain the difference from two sets of sensors both changing in the same directions (all sensors in both sets increasing in resistance, though with different amplitudes) for a given input. This situation can be envisaged in heat flux measurements, where resistance temperature sensors are placed on both sides of a wall of a test object to measure the temperature differences across the wall to obtain heat flux. Resistances of the temperature sensors may increase on both sides of the wall with increasing temperature in heat flux measurements, and their differences across the wall are required for heat flux calculations. The present invention enables such measurements from many sensors on both sides of the wall within a single circuit.

In each of the above example applications, two sets of sensors are identified a priory and connected to each part of the circuit. In a typical application of the invention, for example using resistance strain gages as the sensors, RSA1 (A20) through RSA4 (A23) and RSB1 (B20) through RSB4 (B23) will form four pairs of strain gage resistances. Sensors A20 through A23 will then be disposed on the test object where there would be positive strain (e.g. when the strain gages are under tensile stress). These sensors will then undergo an increase in their resistances due to the tensile stress. Simultaneously, sensors B20 through B23 will be disposed on the test object where there would be a decrease in their resistance (e.g. when the strain gages are under compressive stress). Thus the sensors A20 though A23 complement sensors B20 though B23. The arrangement can be easily reversed without any restrictions. That is, A20 through A23 can be used for sensing negative changing strain (compressive strain) and B20 through B23 can be used for sensing positive strain (tensile strain) with proper arrangement on the test object.

In a typical strain gage application, it is common practice to have the same nominal resistance for all strain gages thus giving rise to the general equality:

For sensors connected to Part A:
RSA=RSA1=RSA2=RSA3=RSA4

For sensors connected to Part B:
RSB=RSB1=RSB2=RSB3=RSB4     (Eq. 5)

Applying the equality of Eq. 5 for Part A, Eq. 3 can now be rewritten as:

$$\left(-\frac{\Delta V0A}{VSA}\right) = \frac{RFA}{RSA}\left(\frac{\Delta RSA1 + \Delta RSA2 + \Delta RSA3 + \Delta RSA4}{RSA}\right) = \frac{RFA}{RSA}\left(\sum_{i=1}^{4}\frac{\Delta RSAi}{RSA}\right)$$

Assuming the strain is uniform across all gages

ΔRSA=ΔRSA1=ΔRSA2=ΔRSA3=ΔRSA4

Therefore, $$\left(-\frac{\Delta V0A}{VSA}\right) \approx 4\frac{RFA}{RSA}\left(\frac{\Delta RSA}{RSA}\right) \quad \text{(Eq. 6)}$$

Those of ordinary skill in the art of strain gage measurements recognize that the fractional sensor resistance change term on the right hand side is related to strain by:

$$\left(\frac{\Delta RSA}{RSA}\right) = G\varepsilon \quad \text{(Eq. 7)}$$

where G is the Gage Factor of the resistance strain gage and ε is the strain on the gage.

Substituting Eq. 7 in Eq. 6, establishes the circuit sensitivity coefficient $S_{QA}$ for the Part A as:

$$S_{QA} = \left|\frac{\left(\frac{\Delta V0A}{VR}\right)}{G\varepsilon}\right| = 4\left(\frac{RFA}{RSA}\right) \quad \text{(Eq. 8)}$$

Similarly, the sensitivity coefficient for Part B can be obtained using Eq. 4 for Part B:

$$\left(\frac{\Delta V0B}{VSA}\right) \approx -4\frac{RFB}{RSB}\left(\frac{\Delta RSB}{RSB}\right) \quad \text{(Eq. 9)}$$

The circuit sensitivity coefficient for Part B is then:

$$S_{QB} = \left|\frac{\left(\frac{\Delta V0B}{VR}\right)}{G*\varepsilon}\right| = 4\left(\frac{RFB}{RSB}\right) \quad \text{(Eq. 10)}$$

Equations 8 and 10 derived above for the sensitivity coefficients show that the sensitivity is proportional to ratio of feedback resistance to sensor resistance and will always be larger than the sensitivity of the Wheatstone bridge under identical strain gage operating conditions.

Temperature Compensation and Heat Flux Measurements

In this section of the specifications, it will be shown how the effect of changes in temperature of the sensor resistances due to ambient temperature variations are minimized using the differential mode operation of the circuit and also how the same circuit embodiment can be useful for heat flux measurements using many sensors.

FIG. 1 embodiment of the invented sensor interface circuit uses both Part A and Part B complementing each other in a differential measurement mode. As shown in FIG. 1, output voltages at A25 (V0A) and B25 (V0B) of operational amplifiers A60 and B60 are identified distinctly as A100 and B100 respectively for output measurements. A100 and B100 can also be used for obtaining their difference in output voltages (V0A-V0B) by any convenient means, including using a difference amplifier or directly connecting the outputs to a data acquisition unit that could then calculate the difference.

Because of the typical high gain property of operational amplifiers, $$VSA = VSB = VR \quad \text{(Eq. 11)}$$

Normalizing the difference voltage (V0A-V0B) with VR to represent difference output as a non-dimensional quantity and taking the difference of Eq. 6 and Eq. 9 we obtain:

$$\left(\frac{\Delta V0A - \Delta V0B}{VR}\right) = 4\frac{RFA}{RSA}\left(\frac{\Delta RSA}{RSA}\right) - 4\frac{RFB}{RSB}\left(\frac{\Delta RSB}{RSB}\right) \quad \text{(Eq. 12)}$$

If the resistance changes are not identical in all gages, the associated general expression is:

$$\left(\frac{\Delta V0A - \Delta V0B}{VR}\right) = \frac{RFA}{RSA}\left(\sum_{i=1}^{4}\frac{\Delta RSAi}{RSA}\right) - \frac{RFB}{RSB}\left(\sum_{i=1}^{4}\frac{\Delta RSB}{RSB}\right) \quad \text{(Eq. 13)}$$

Further, it is common practice to have the same nominal resistances RS for all strain gages in both Part A and Part B. Therefore, $$RS = RSA = RSB \quad \text{(Eq. 14)}$$

Also, using the same feedback resistance value in both parts A and B of the circuit:

$$RF = RFA = RFB \quad \text{(Eq. 15)}$$

Substituting these values RS and RF in Eq. 12, identifying the fractional changes from each part with appropriate subscripts:

$$\left(\frac{\Delta V0A - \Delta V0B}{VR}\right) = 4\frac{RF}{RS}\left[\left(\frac{\Delta RS}{RS}\right)_{PART\ A} - \left(\frac{\Delta RS}{RS}\right)_{PART\ B}\right] \quad \text{(Eq. 16)}$$

Eq. 16 shows that identical resistance changes in Part A and Part B (due to identical ΔRS in all the sensors) produce no output change in the circuit. This feature is useful in minimizing the effects of ambient temperature changes in sensors in this invention as is accomplished in a Wheatstone bridge. As indicated in Eq. 16, this temperature compensation is possible even with more sensor pairs than in the Wheatstone bridge.

For heat flux measurement applications using resistance temperature sensors, the resistance sensors are located on both sides of a separating wall. The difference in temperatures across the wall is a measure of heat flux. Eq. 16 shows that the difference in output voltage can be calibrated in terms of temperature differences useful for heat flux measurements from many sensor pairs located on both sides of the wall. The chief advantage of this embodiment is that many sensor pairs can be used in the same circuit without need for multiple Wheatstone bridges.

Full Circuit Sensitivity and Constant Voltage Operation of the Sensors

Previously, sensitivity coefficient of each part of the interface circuit was derived. In this section, the sensitivity of the full circuit having both the parts operating in a differential mode operation similar to a Wheatstone bridge is derived. It will be established that the sensitivity of my invention can be several times larger than the Wheatstone bridge operating under identical conditions. Also, the unique constant voltage operation of all the sensors connected to the circuit is highlighted in this section.

Strain gages with positive changing strain (tensile strain) will have +ΔRS and at the same time those with negative changing strain (compressive strain) will have a −ΔRS in Eq. 16. By arranging the sensors appropriately in Part A and Part B, the associated fractional changes $$\left(\frac{+\Delta RS}{RS}\right)_{PART\ A}$$

for tensile and $$\left(\frac{-\Delta RS}{RS}\right)_{PART\ B}$$

for compressive strains are obtained. Applying these terms from Part A and Part B into Eq. 16, we obtain:

$$\left(\frac{\Delta V0A - \Delta V0B}{VR}\right) = 8\left(\frac{RF}{RS}\right)\left(\frac{\Delta RS}{RS}\right) \quad \text{(Eq. 17)}$$

Eq. 17 is shown for identical (magnitude) changes in all sensors. The sensitivity coefficient $S_Q$ of the complete invented interface circuit is given by:

$$S_Q = \left[\frac{\left(\frac{\Delta V0A - \Delta V0B}{VR}\right)}{\left(\frac{\Delta RS}{RS}\right)}\right] = 8\left(\frac{RF}{RS}\right) \quad \text{(Eq. 18)}$$

If changes in Part A and Part B are not equal in magnitude, Eq. 18 will have a different coefficient on the right hand side, instead of 8 (as seen in Eq. 13). The sensitivity coefficient $S_Q$ is proportional to the ratio of RF and RS in my circuit, (shown in Eq. 18) The design values of RF and RS can be chosen such that the sensitivity coefficient is much larger than the Wheatstone bridge sensitivity coefficient with the sensors operating under identical conditions in both cases.

From Eq. (13), it is seen that if Part A and Part B are operated with the same nominal resistances and have identical gains (RFA/RSA) and (RFB/RSB), individual operational amplifier drifts tend to cancel in the circuit.

It is known to those of ordinary skill in the art of Wheatstone bridge analysis that operating under identical sensor voltage VSA across each sensor will make the Wheatstone bridge voltage VB=2 VSA. Considering that the Wheatstone bridge is operated with its maximum two sensor pairs, one pair with positive changes and the other with negative changes like those considered for FIG. 1, (with all resistance changes identical in magnitude like those considered for deriving Equation 18), the sensitivity coefficient of the Wheatstone bridge ($S_{WB}$) will be:

$$S_{WB} = 2 \quad \text{(Eq. 19)}$$

Therefore, the ratio of the sensitivities with four pairs of sensors in my sensor interface circuit and two pairs of sensors in the Wheatstone bridge will be:

$$\frac{S_Q}{S_{WB}} = 4\left(\frac{RF}{RS}\right) \quad \text{(Eq. 20)}$$

The ratio of RF to RS will generally be large in any normal design.

Ratio of the sensitivities with five pairs of sensors in my sensor interface circuit and two pairs (maximum) of sensors in Wheatstone bridge will be:

$$\frac{S_Q}{S_{WB}} = 5\left(\frac{RF}{RS}\right) \quad \text{(Eq. 21)}$$

Therefore, ratio of the sensitivities with six pairs of sensors in sensor interface circuit and two pairs of sensors in Wheatstone bridge would be $$\frac{S_Q}{S_{WB}} = 6\left(\frac{RF}{RS}\right) \quad \text{(Eq. 22)}$$

The maximum number of sensor pairs that the new invention can accommodate is dependent on the design limits of the operational amplifiers and linear range of operation without saturation. However, this limit can be enhanced with the output zeroing feature described later.

By virtue of the high gain property of operational amplifiers, it is known that in FIG. 1:

VSA=VR and VSB=VR (Eq. 23)

Eq. 23 shows that the voltage VSA across the sensors in Part A is identical to the voltage VSB across the sensors in Part B. Both voltages are then identical to the constant reference voltage VR. Thus, it is seen that the voltage across all the sensors connected in the new invention circuit either in Part A or Part B are identical and remain constant even if the sensor resistance changes. Hence, constant voltage operation is accomplished with the associated advantages: independence of cable capacitance effects, and EMI and RFI noise immunity. The advantages of constant voltage operation are well documented in literature.

Estimation of Average of Variables

It can be seen from Eq. 13 independently that for either Part A or Part B, the average of variables that are proportional to the fractional changes of sensor resistances from many sensors can be estimated. It is a very useful feature in engineering measurements.

Inverting Input Pin Isolation, Output Zeroing and Sensitivity Coefficient

In this section, methods of improving noise immunity from cable connections, the ability to adjust the output voltage to zero for higher resolution measurements and higher sensitivity design considerations are presented.

Figure 2:
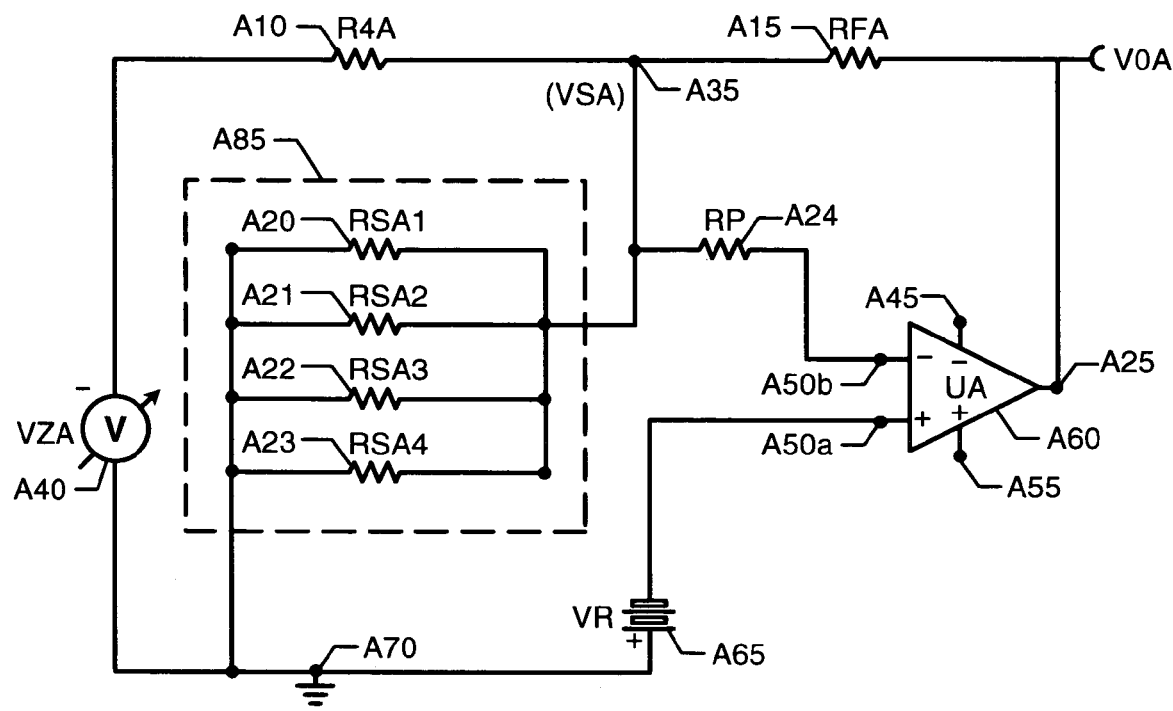
FIG. 2 is a schematic drawing of Part A from FIG. 1, but with the added features of output zeroing and input pin isolation depicted.

Generally, sensors placed on the test specimen are brought to the measurement circuit using coaxial cables. For use with the present invention, therefore, these cables are brought to the inverting input point of the operational amplifier for their parallel arrangement at that point. A disturbance at this inverting point of the operational amplifier from external cable connections may cause associated output disturbances because of operational amplifier gain. Therefore, it may be necessary to isolate the inverting input point (A50b in Part A and B50b in Part B) from direct contact with the sensor cables for better noise immunity. In the new sensor interface circuit this immunity feature can be accomplished without any loss of performance by inserting a resistor A24 (resistance RP) between terminal A35 and A50b as illustrated in FIG. 2. (A similar arrangement can be made for Part B). To accomplish such an isolation, a diode may also be used instead of a resistance.

In FIG. 2 resistor A10 (resistance R4A), and a variable voltage source A40 (voltage VZA) are added to the circuit of FIG. 1. This feature is added to Part B as well. The purpose of these two components is to make it possible to adjust the output A25 (voltage V0A) to zero volts whenever needed by injecting additional current into the junction A35 formed by the sensors, so as to minimize the current in the feedback resistance RFA. This is usually done at the start of a test. Alternatively, a fixed voltage and a variable resistor combination could be utilized to accomplish the zeroing task. The magnitude of output voltage changes from the circuit, due to fractional changes in the resistances in response to the test inputs, is usually very small compared to the initial output voltages at zero test input. With output zeroed, it is then possible to use a smaller voltage range in the measuring instrument invariably achieving higher resolutions than with the higher voltage range required without such zeroing. For FIG. 2, the governing equation is:

$$\frac{(VZA - VSA)}{R4A} = VSA\left[\left(\frac{1}{RSA1}\right) + \left(\frac{1}{RSA2}\right) + \left(\frac{1}{RSA3}\right) + \left(\frac{1}{RSA4}\right)\right] + \left[\frac{(VSA - V0A)}{RFA}\right] \quad \text{(Eq. 24)}$$

Eq. 24 can be rearranged for the output voltage V0A as:

$$V0A = \left[VSA\left[1 + RFA\left[\left(\frac{1}{RSA1}\right) + \left(\frac{1}{RSA2}\right) + \left(\frac{1}{RSA3}\right) + \left(\frac{1}{RSA4}\right)\right]\right]\right] - VZA\left(\frac{RFA}{R4A}\right) \quad \text{(Eq. 25)}$$

Therefore as seen in Eq. 25, for a given set of sensor resistances RSA1, RSA2, RSA3 and RSA4, feedback resistance RFA, zeroing series resistance R4A and sensor voltage VSA (a constant), VZA can be adjusted to obtain V0A=0 at any point in measurement operations, usually at the start of a test.

From Eq. 25, output voltage V0A=0 when:

$$VZA = \left[VSA*\left[1 + R4A*\left[\left(\frac{1}{RSA1}\right) + \left(\frac{1}{RSA2}\right) + \left(\frac{1}{RSA3}\right) + \left(\frac{1}{RSA4}\right) + \left(\frac{1}{RFA}\right)\right]\right]\right] \quad \text{(Eq. 26)}$$

In normal applications with usual RSA=RSA1=RSA2=RSA3=RSA4 as shown in Eq. 5, in the application considered with four pairs of sensors, VZA needed to satisfy the Eq. 26 to make the output V0A zero, can be estimated as:

$$VZA = VSA\left[1 + R4A * \left(\frac{4}{RSA} + \frac{1}{RFA}\right)\right] \quad \text{(Eq. 27)}$$

It may be noted that an alternative zeroing arrangement equally valid would be to make the resistance R4A a variable with a fixed voltage VZA. A similar zeroing equation exists for Part B.

If all the sensors are identical, it is possible that the zeroing may not be required since difference voltages are measured anyway, where initial voltages from both parts tend to cancel. However, the zeroing helps overcome offsets due to any component tolerances.

In normal applications with usual RSA=RSA1=RSA2=RSA3=RSA4 as specified in Eq. 5, in the application considered with four pairs of sensors and with RFA>>RSA, Eq. 25 can be rewritten as:

$$V0A = VSA\left[1 + \left(\frac{4RFA}{RSA}\right) + \frac{RFA}{R4A}\right] - VZA\frac{RFA}{R4A} \quad \text{(Eq. 28)}$$

Eq. 28 shows that the right hand side term can be minimized with proper adjustment of VZA, and V0A can be made zero, independent of feedback resistor RFA for RFA>>RSA which is usually the case. Hence larger RFA values can be chosen for operation of the circuit, and it was already shown (Eq. 18) that larger RFA would give larger sensitivity coefficient $S_{QA}$. Same type of zeroing arrangement can be applied to Part B also.

Embodiment For Operation as a Hot-Wire (Hot-Film) Anemometer

Figure 3A:
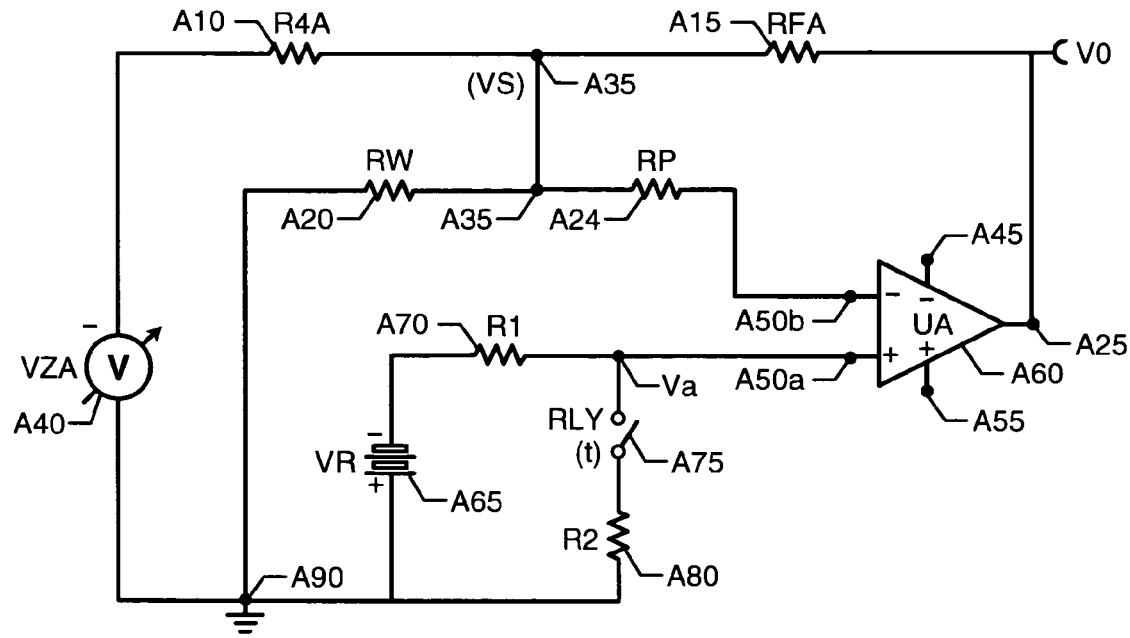
FIG. 3a is schematic drawings of an invention embodiment for a Constant Voltage Anemometer showing a potential divider switching arrangement for hot-wire (hot-film) time constant measurement.
Figure 3B:
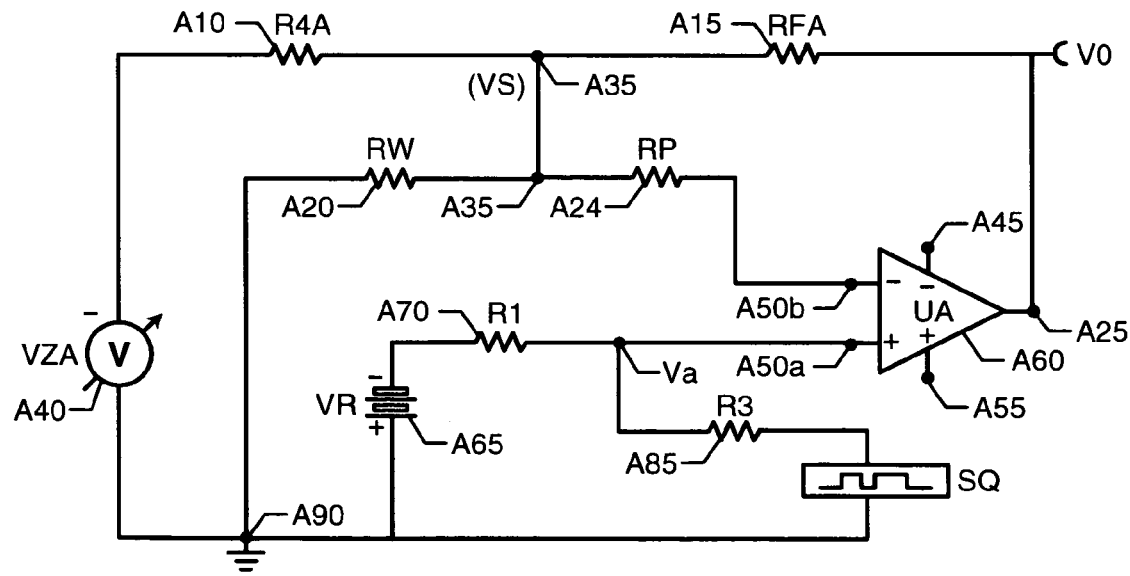
FIG. 3b is schematic drawings of an invention embodiment for a Constant Voltage Anemometer showing a square wave input arrangement for hot-wire (hot-film) time constant measurement.

One embodiment of the present invention is a new constant voltage hot-wire (hot-film) anemometer with built-in features for in situ hot-wire (hot-film) time constant measurement, overheat estimation and output zeroing. The circuit supplies a constant voltage across the hot-wire (hot-film) sensor passing current that is adequate to heat the sensor above its ambient temperature. Airflow over the heated sensor changes its resistance due to heat loss to the fluid flow, which the anemometer circuit converts into a proportional output voltage change. Knowledge of the values of the time constant and overheat of the hot-wire (hot-film) under the actual test conditions is very important in post processing of the measured data with the hot-wire (hot-film). The time constant measurement is accomplished by switching the voltage level across the sensor. This technique is covered extensively in related literature. FIG. 3a shows an arrangement to switch the voltage level across the hot-wire (hot-film). This arrangement uses a potential divider across the constant voltage connected to the non-inverting input of the operational amplifier in order to accomplish time constant measurements of the hot-wire (hot-film). An alternative arrangement to switching the voltage across the hot-wire (hot-film) is superimposing a square wave voltage over the constant voltage at the non-inverting input is shown in FIG. 3b. In the anemometer embodiment, only one sensor (resistance type hot-wire or hot-film) is used with only one part of the invention.

The anemometer circuit configuration in FIG. 3a is the same as the embodiment in FIG. 2 but for its operation with only a single sensor and the changes made at the non-inverting input of the operational amplifier. The changes at the non-inverting input are in place to switch the voltage level across the hot-wire (hot-film) thereby enabling in situ hot-wire (hot-film) time constant measurement.

Referring to FIG. 3a, a resistor A70 is now connected from the voltage source A65 to the non-inverting input of the operational amplifier. Resistor A70 is a part of a potential divider formed with resistor A80 and a relay switch A75 (RLY). When the relay is operated, there will be a step change in potential across the sensor due to the potential divider action associated with a step change in voltage Va. The voltage level after the step change remains constant at a new switched voltage level for a specified duration. Consequently, a constant voltage equal to the switched voltage level is applied to the sensor for the specified duration. This switching is done only when required to measure the time constant. In normal flow measurement operation the constant voltage from A65 is directly connected to the non-inverting input through the series resistor R1, with the relay turned off.

FIG. 3b shows an alternative approach to obtain the step change in voltage across the sensor. The relay arrangement shown in FIG. 3a is removed at the non-inverting input of the operational amplifier and voltage pulses are injected from external pulse source at the same non-inverting point. In this arrangement, the constant voltage VR is connected to the non-inverting input of the operational amplifier through the resistor A70 and a square wave voltage SQ from external source is superimposed over the constant voltage through a series resistor A85 at the non-inverting input of the operational amplifier causing step changes across the sensor associated with a step change in Va. The voltage level at each superimposed level remains constant for required duration applying a constant voltage to the sensor at that level during that period. The square wave is superimposed only when required to measure the time constant. In normal operation the constant voltage from A65 is directly connected to the non-inverting input through the resistor A70 with square wave turned off.

Again, the sensor is operated with a constant voltage VS at the junction A35 across the sensor A20 during normal measurement operation or at a constant switched voltage level for a period during time constant measurements. This embodiment of the constant voltage anemometer circuit also allows zeroing the output voltage within the circuit. Zeroing arrangement is identical (with voltage A40 (VZA) and resistor A10 (R4A)) to the multi-sensor configuration shown earlier in FIG. 2. As shown before, zeroing enables use of larger feedback resistances to obtain larger sensitivity. Output zeroing itself gives higher resolution in the output measurement than the related devices.

Estimation of In Situ Time Constant and Overheat of the Hot-Wire (Hot-Film)

The time constant of the hot-wire (hot-film) is obtained by analyzing the first order response of the hot-wire (hot-film) to the step change in the voltage across the hot-wire (hot-film). The invented circuit is highly amenable for this feature with a simple setup described with the methods shown in FIGS. 3a and 3b. This step change in voltage Va at the non-inverting input A50a appears with the same step change in VS across the sensor at the A35 junction. The voltage step change across the sensor causes a first order dynamic response from the hot-wire sensor. Step response tests in hot-wires are well documented in literature.

Unique advantage of the embodiment is that the time constant is measured in situ during actual operating conditions of the wire in flow measurement tests within the flow and without the need to move the sensor to any other circuit. Hence the method provides true in situ time constant value of the hot-wire at the actual operating conditions of overheat and flow.

Eq. 28 can be modified to represent the output voltage as (FIGS. 3a and 3b), applicable to single sensor operation in this application:

for RFA>>RW which is valid for the practical designs:

$$VOA = RFA * \left[\left(\frac{VS}{RW}\right) - \left(\frac{VZA}{R4A}\right)\right] \quad \text{(Eq. 29)}$$

With any applied voltage VS across the hot-wire, the in situ hot wire resistance can be estimated, from measured V0A and VZA, and knowledge of circuit constants RFA and R4A:

$$RW = \frac{VS}{\left[\left(\frac{V0A}{RFA}\right) + \left(\frac{VZA}{R4A}\right)\right]} \quad \text{(Eq. 30)}$$

If the output is adjusted to zero at that point, then:

$$RW = \frac{VS}{VZA} R4A \quad \text{(for } V0A = 0\text{)} \quad \text{(Eq. 31)}$$

At every test point, all the terms on the right hand side of Eq. 30 and Eq. 31 will be readily available for measurements in real time. Therefore, in situ hot-wire resistance can be estimated. Using the in situ estimated hot-wire (hot-film) resistance values, with established procedures available in literature, calculation of the in situ hot-wire overheat is routinely possible with my invention.

Embodiment to Measure Dynamic Capacitance

Figure 4:
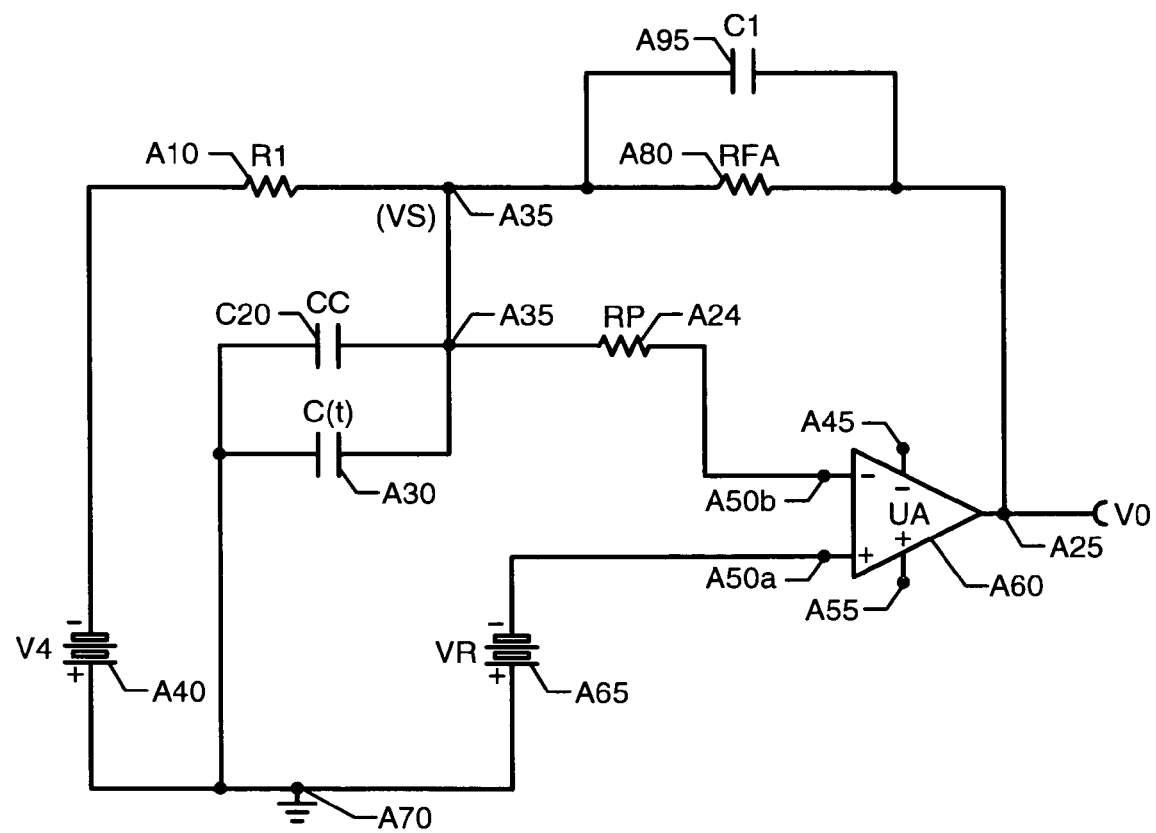
FIG. 4 is a schematic of an invention embodiment to measure dynamic capacitance changes in real time with built-in integration features.

In yet another embodiment of the present invention, capacitance changes in real time can be measured using capacitance sensors. In this embodiment, a constant voltage is again applied across the capacitance sensor. Dynamic capacitance changes in the sensor produce proportional current from the sensor. The circuit responds to only dynamic tests causing changes in the capacitance with time. This capacitance change with time will accordingly produce a change in sensor current from the dynamic test. This current change will produce a proportional output voltage change from the circuit. Like in the anemometer embodiment, there will be only one sensor. The new embodiment of the sensor interface circuit for this application is shown in FIG. 4. A constant voltage reference A65 (VR) is again connected to the non-inverting input of the operational amplifier as is done in previous embodiments. A dynamic capacitance sensor A30 (C(t)) is connected between the ground terminal A70 and the inverting input of the operational amplifier A60 forming the junction at A35 as shown. The voltage VS at the junction A35 remains constant even if the capacitance changes since VS=VR. The zeroing arrangement and input isolation are identical to the earlier described embodiment. A sensor connecting cable capacitance C20 (CC) appears across the dynamic capacitance A30(C(t)). A feedback resistor A80 (RFA), the input isolation resistor A24 (RP) and the output zeroing resistor A10 (R1) with voltage source A40 (V4) again are disposed at the same place as in the previously described embodiments. A capacitor A95 (C1) is additionally connected across the feedback resistor A80. Those of ordinary skill in the art of circuit analysis can see that in FIG. 4 at a signal frequency f:

$$V0(t) = \frac{C(t)}{C1} VS \quad \text{for } 2*\pi*f*C1*RFA >> 1 \quad \text{(Eq. 32)}$$

Thus, from Eq. 32, the output voltage change with time V0(t) is directly proportional to capacitance change with time C(t) and independent of the cable capacitance CC (C20). Instead of a single resistor A80 for RFA, a combination of three resistors RF1, RF2 and RF3 in a T network arrangement to obtain large resistances could also be used where needed.

SCOPE OF THE INVENTION

A variety of beneficial embodiments of the present invention have been described above. However, it will be appreciated that other embodiments can be readily envisaged and made by one of ordinary skill in the related art, given the written description and figures above, without changing the spirit and scope of the present invention.

What is claimed is:

1. A sensor circuit having a first Part, the first Part comprising:
   an operational amplifier equipped with
      an inverting input,
      a non-inverting input, and
      an output,
   a plurality of resistance-based sensors electrically connected to one another in a parallel configuration having first and second sides across which a voltage can be applied wherein the voltage so-applied will be identical across each of the sensors,
      the first side of the parallel configuration connected to a connecting junction,
      and
      the second side of the parallel configuration connected to a ground terminal,
   a feedback resistor connected between the operational amplifier output and the connecting junction,
   a variable voltage source and a first series resistor connected in series between the ground terminal and the connecting junction wherein a voltage at the output of the operational amplifier can be adjusted to zero by adjusting the voltage output of the variable voltage source,
   and
   a constant voltage source with
      a constant voltage source first end connected to the non-inverting input of the operational amplifier, and
      a constant voltage source second end connected to the ground terminal.

2. The sensor circuit of claim 1, further comprising:
   an isolation resistor connected between the inverting input of the operational amplifier and the connecting junction for isolating the inverting input from in-line electrical disturbances.

3. The sensor circuit of claim 1, further comprising:
a second Part, constructed identically to the first Part, and connected to the first Part between the ground terminal of the first part and the ground terminal of the second Part, wherein the sensors of the first Part are adapted to be coupled to one portion of a test object while the sensors of the second Part are adapted to be simultaneously coupled to another portion of the test object.

4. The sensor circuit of claim 1, further comprising:
a second series resistor connected between the first end of the constant voltage source and the non-inverting input of the operational amplifier.

5. The sensor circuit of claim 4, further comprising:
a relay and a third series resistor in series, connected from the ground terminal to a junction formed by the connection between the second series resistor and the non-inverting input of the operational amplifier.

6. The sensor circuit of claim 4, further comprising:
a third series resistor and a pulse generator in series, connected from the ground terminal to a junction formed by the connection between the second series resistor and the non-inverting input of the operational amplifier.

7. A method of obtaining measurements from a sensor circuit comprising the steps of:
providing a plurality of variable-resistance sensors electrically connected to one another in a parallel configuration having first and second sides across which a voltage can be applied wherein the voltage so-applied will be identical across each of the sensors,
installing the sensors on a test object,
applying a constant voltage across the parallel configuration thereby causing current to flow through each of the sensors wherein a total current from the parallel configuration is formed from the current flowing through each of the sensors,
exposing the sensors in the parallel configuration to a test input capable of causing resistance changes in the sensors and associated current changes in the sensors,
passing the total current from the parallel configuration through a fixed feedback resistor connected between an inverting input of an operational amplifier and an output of the operational amplifier, wherein said step of applying comprises the steps of (i) connecting the parallel configuration between the inverting input of the operational amplifier and a ground terminal, and (ii) applying the constant voltage at a non-inverting input of the operational amplifier,
providing an isolation resistor between the parallel configuration and the inverting input of the operational amplifier,
injecting additional current with a resistance and voltage in series at a junction formed by a connection between the parallel configuration, the fixed feedback resistor, and the isolation resistor,
measuring a change in voltage drop across the fixed feedback resistor due to the current changes,
and
converting the change in voltage drop across the fixed feedback resistor to a measurement parameter.

* * * * *